United States Patent
Hou et al.

(10) Patent No.: US 11,288,481 B2
(45) Date of Patent: Mar. 29, 2022

(54) FINGERPRINT SENSOR, FINGERPRINT RECOGNITION MODULE AND FINGERPRINT RECOGNITION SYSTEM

(71) Applicant: Shenzhen Goodix Technology Co., Ltd., Shenzhen (CN)

(72) Inventors: Jiayun Hou, Shenzhen (CN); Yue Ma, Shenzhen (CN); Heping Huang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/036,212

(22) Filed: Sep. 29, 2020

(65) Prior Publication Data

US 2021/0012079 A1    Jan. 14, 2021

Related U.S. Application Data

(63) Continuation of application No. PCT/CN2019/094650, filed on Jul. 4, 2019.

(51) Int. Cl.
*G06K 9/00* (2006.01)

(52) U.S. Cl.
CPC ....... *G06K 9/0002* (2013.01); *G06K 9/00053* (2013.01)

(58) Field of Classification Search
CPC .......... G06K 9/0002; G06K 9/00053; G06F 3/0416; G06F 3/044; G06F 21/32; G06F 1/325
See application file for complete search history.

(56) References Cited

U.S. PATENT DOCUMENTS

| | | | | |
|---|---|---|---|---|
| 2004/0096086 A1* | 5/2004 | Miyasaka | ........... | G06F 3/03547 382/124 |
| 2016/0042215 A1* | 2/2016 | Wang | ................. | G06K 9/00087 382/124 |

(Continued)

FOREIGN PATENT DOCUMENTS

| | | | | |
|---|---|---|---|---|
| CN | 103729615 A | | 4/2014 | |
| CN | 104303288 A | * | 1/2015 | ........... G07F 7/1008 |

(Continued)

OTHER PUBLICATIONS

Extended European Search Report dated Apr. 9, 2021, in connection with corresponding EP Application No. 19920631.9; 8 pages.

(Continued)

*Primary Examiner* — Bobbak Safaipour
*Assistant Examiner* — Wassim Mahrouka
(74) *Attorney, Agent, or Firm* — Maier & Maier, PLLC

(57) ABSTRACT

A fingerprint sensor, a fingerprint recognition module and a fingerprint recognition system. The fingerprint sensor includes: a sensor die configured to collect fingerprint information; a package structure configured to package the sensor die, where the sensor die or the package structure includes a first metal electrode, which is connected with a touch detection module, and the touch detection module is connected with a control module and is configured to feed back a touch signal to the control module, so as to enable the control module to supply power to the fingerprint sensor according to the touch signal, and then enable the sensor die to collect fingerprint information. Under the premise of ensuring low standby power consumption of the fingerprint recognition system, the anti-interference ability and the ESD performance of the fingerprint recognition module are improved, and the flexibility of the touch detection scheme is improved.

20 Claims, 6 Drawing Sheets

(56) References Cited

U.S. PATENT DOCUMENTS

2016/0292488 A1 10/2016 Ran et al.
2018/0224955 A1 8/2018 Chen et al.

FOREIGN PATENT DOCUMENTS

| CN | 106250891 A | 12/2016 |
| CN | 106355157 A | 1/2017 |
| CN | 206179849 U | 5/2017 |
| CN | 207882927 U * | 9/2018 |

OTHER PUBLICATIONS

International Search Report dated Mar. 24, 2020 in corresponding International application No. PCT/CN2019/094650; 4 pages.

* cited by examiner

FINGERPRINT SENSOR, FINGERPRINT RECOGNITION MODULE AND FINGERPRINT RECOGNITION SYSTEM

CROSS-REFERENCE TO RELATED APPLICATION

This application is a continuation of International Application No. PCT/CN2019/094650, filed on Jul. 4, 2019, the content of which is incorporated herein by reference in its entirety.

TECHNICAL FIELD

The present disclosure relates to the technical field of fingerprint recognition and, in particular, to a fingerprint sensor, a fingerprint recognition module and a fingerprint recognition system.

BACKGROUND

Fingerprint recognition technology is a recognition means for verifying identity through fingerprint comparison, and it is also the most widely used biometric recognition technology nowadays. With the development of terminal device and the development of fingerprint recognition technology, the demand for fingerprint recognition technology in the field of fingerprint locks is also expanding. Since there is a high requirement for the standby power consumption of a fingerprint recognition system in the field of fingerprint locks, how to reduce the power consumption of the fingerprint recognition system has become a technical problem to be solved urgently.

In the prior art, in order to solve the problem of high standby power consumption of the fingerprint recognition system, a combination of a fingerprint sensor, a metal ring and a touch chip is usually employed to realize low power standby of the fingerprint recognition system. Specifically, when the fingerprint recognition system is in a standby state, a fingerprint lock master disconnects power supply of a fingerprint algorithm chip and a fingerprint sensor. When a user touches a metal ring, a touch chip receives a signal of touching the metal ring by the user, and sends the signal of touching metal ring by the user to the fingerprint lock master, and then the fingerprint lock master supplies power to the fingerprint algorithm chip and the fingerprint sensor to perform an operation such as fingerprint register and recognition.

However, in the prior art, since the metal ring is exposed, there are some problems including high touch sensitivity, poor anti-interference ability, great influence by the whole structure of the fingerprint lock, low reliability and etc.

SUMMARY

The present disclosure provides a fingerprint sensor, a fingerprint recognition module and a fingerprint recognition system, which, under the premise of ensuring low standby power consumption of the fingerprint recognition system, improve the anti-interference capability and the Electro-Static discharge (ESD) performance of a fingerprint recognition module, and improve the flexibility of a touch detection scheme as well, so as to meet the requirements of a whole lock easier.

In a first aspect, the present disclosure provides a fingerprint sensor, including:
a sensor die, configured to collect fingerprint information; and a package structure, configured to package the sensor die; where the sensor die or the package structure includes a first metal electrode, the first metal electrode is connected with a touch detection module, and the touch detection module is connected with a control module and is configured to feed back a touch signal to the control module, so as to enable the control module to supply power to the fingerprint sensor according to the touch signal, and then enable the sensor die to collect fingerprint information.

In this scheme, the metal electrode is provided in the sensor die or the package structure to avoid being exposed. When this scheme is applied to the fingerprint recognition system mentioned above, under the premise of ensuring low standby power consumption of the fingerprint recognition system, the anti-interference capability and ESD performance of the fingerprint recognition module are improved, and due to the advantage of integrating the metal electrode with the fingerprint sensor, the flexibility of the touch detection scheme is improved as well, and thus it is easier to meet the requirements of a whole lock.

In an implementation, the package structure includes a plastic packaging material, which is located above or covers the sensor die, and the first metal electrode is located in the plastic packaging material.

In an implementation, the package structure includes a substrate, the sensor die is located on the substrate, and the first metal electrode is located in the substrate.

In an implementation, the substrate is a printed circuit board (PCB) or a semiconductor substrate.

In an implementation, the first metal electrode is located in a preset area of a wiring area in the substrate, and there is no metal material in a preset space of an area directly above the first metal electrode.

In an implementation, the first metal electrode is located on a top metal layer of the substrate.

In an implementation, the first metal electrode is located in an insulation area in the substrate, and there is no wiring area in a preset space of an area directly above the first metal electrode in a vertical direction.

In an implementation, the substrate includes, sequentially from top to bottom:
a first insulation area, a first wiring area, a second insulation area, a second wiring area and a third insulation area, Where the first metal electrode is located at a periphery of the first wiring area.

In this scheme, by disposing the metal electrode at the periphery of the first wiring area, it is ensured that the touch detection module meets the requirement of sensitivity and has high reliability, when the metal electrode is touched by a human hand.

In an implementation, the substrate includes, sequentially from top to bottom:
a first insulation area, a first wiring area, a second insulation area, a second wiring area and a third insulation area, where the first metal electrode is located above the first wiring area and in the first insulation area.

In an implementation, the fingerprint sensor provided in the present disclosure further includes:
a second metal electrode, where the second metal electrode is located at a periphery of the first metal electrode and is connected with a grounding end of the fingerprint sensor.

In this scheme, by designing a second metal electrode at the periphery of the first metal electrode and connecting the second metal electrode with the grounding end of the fingerprint sensor, the interference can be effectively reduced and the ESD capability can be improved.

In an implementation, in the second wiring area, a corresponding area directly below the first metal electrode is a ground laying area.

In this scheme, by performing ground laying on the corresponding area which is in the second wiring area and directly below the first metal electrode, the anti-interference capability of the fingerprint sensor is improved.

In an implementation, the first metal electrode is annular.

In an implementation, the sensor die includes a detection electrode, where the detection electrode is configured to collect the fingerprint information, and the first metal electrode is located at a periphery of the detection electrode.

In an implementation, the first metal electrode and the detection electrode are located on a same layer.

In an implementation, the detection electrode includes a plurality of capacitors arranged in a matrix.

In a second aspect, an embodiment of the present disclosure provides a fingerprint recognition module, including: a fingerprint algorithm chip, and the fingerprint sensor provided in the first aspect or any implementation of the first aspect of embodiments of the present disclosure, where the fingerprint algorithm chip is connected with the fingerprint sensor.

The fingerprint sensor is configured to collect fingerprint information, and the fingerprint algorithm chip is configured to process the fingerprint information.

In an implementation, the fingerprint recognition module provided in an embodiment of the present disclosure further includes:

a touch detection module, where the touch detection module is connected with the first metal electrode in the fingerprint sensor and is configured to detect whether there is a finger touching the fingerprint sensor.

The fingerprint recognition module in this scheme includes a fingerprint algorithm chip and a fingerprint sensor, where the fingerprint sensor is provided with a metal electrode in the sensor die or package structure, therefore the reliability of the fingerprint sensor is improved, and thus the reliability of the fingerprint recognition module is improved. In addition, since the metal electrode is connected with the touch detection module, and the touch detection module is connected with the control module and feeds back a touch signal to the control module to enable the control module to supply power to the fingerprint recognition module according to the touch signal, it is ensured that only the touch detection module is power supplied when there is no finger pressing, which reduces the standby power consumption of the fingerprint recognition module.

In a third aspect, the present disclosure provides a fingerprint recognition system, including: a touch detection module, a control module, and the fingerprint recognition module as provided in the second aspect or any implementation of the second aspect.

The touch detection module is connected with the first metal electrode in the fingerprint sensor through a first pin of the fingerprint recognition module and is configured to detect whether there is a finger touching the fingerprint sensor; the touch detection module is connected with the control module, and is configured to feed back to the control module whether there is a finger touching the fingerprint sensor and send the control module a touch signal if the touch detection module detects that there is a finger touching the fingerprint sensor; the control module is connected with the fingerprint recognition module through a second pin of the fingerprint recognition module and is configured to control a power source to supply power for the fingerprint recognition module according to the touch signal sent by the touch detection module.

In the fingerprint recognition system provided by embodiments of the present disclosure, the touch detection module is connected with the first metal electrode in the fingerprint sensor through a first pin of the fingerprint recognition module and detects whether there is a finger touching the fingerprint sensor, the touch detection module feeds back to the control module a touch signal, and then the control module controls the power source to supply power for the fingerprint recognition module according to the touch signal, thereby ensuring that the power source supplies power only to the touch detection module when there is no finger pressing, which reduces the power consumption of the fingerprint recognition system.

The present disclosure provides a fingerprint sensor, a fingerprint recognition module and a fingerprint recognition system. The fingerprint sensor includes: a sensor die, configured to collect fingerprint information; and a package structure, configured to package the sensor die, where the sensor die or the package structure includes a first metal electrode, the first metal electrode is connected with a touch detection module, and the touch detection module is connected with a control module and is configured to feed back a touch signal to the control module, so as to enable the control module to supply power to the fingerprint sensor according to the touch signal, and then enable the sensor die to collect fingerprint information. Since the metal electrode is provided in the sensor die or the package structure, a mis-touch on the metal electrode is avoided effectively, and thus the reliability of the fingerprint sensor is improved. In addition, since the metal electrode is connected with the touch detection module, and the touch detection module is connected with the control module and is configured to feed back the touch signal to the control module, under the premise of ensuring low standby power consumption of the fingerprint recognition system, the anti-interference capability and the ESD performance of the fingerprint recognition module are improved, and the flexibility of the touch detection scheme is improved as well, and thus it is easier to meet the requirements of a whole lock.

BRIEF DESCRIPTION OF DRAWINGS

To illustrate the technical solutions in embodiments of the present disclosure or in the prior art more clearly, the following briefly introduces the accompany drawings needed for describing the embodiments or the prior art. Apparently, the accompanying drawings in the following description are some embodiments of the present disclosure, and for those of ordinary skill in the art, they may still obtain other drawings according to these accompanying drawings without creative effort.

DESCRIPTION OF EMBODIMENTS

Figure 1A:
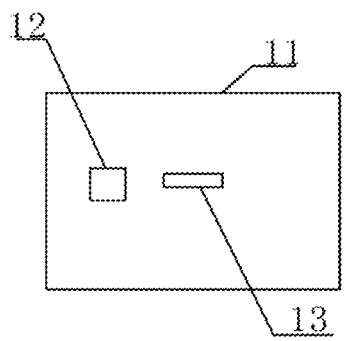
FIG. 1A is a schematic diagram of longitudinal sections of a fingerprint sensor provided in an embodiment of the present disclosure.

To make the objectives, technical solutions, and advantages of embodiments of the present disclosure clearer, the following clearly and comprehensively describes the technical solutions in embodiments of the present disclosure with reference to the accompanying drawings in embodiments of the present disclosure. Apparently, the described embodiments are merely a part rather than all embodiments of the present disclosure. All other embodiments obtained by those of ordinary skill in the art based on embodiments of the present disclosure without creative effort shall fall within the protection scope of the present disclosure.

The terms "first", "second", "third", "fourth" and etc. (if present) in the description, claims and the above accompanying drawings of the present disclosure are used to distinguish similar objects, and not necessarily used to describe a specific order or sequence. It should be understood that the terms used in this way can be interchanged under appropriate circumstances, so that the embodiments of the present disclosure described herein can be implemented in an order other than those illustrated or described herein, for example. Furthermore, the terms "including" and "comprising" as well as any variations thereof are intended to cover non-exclusive inclusions. For example, a process, a method, a system, a product or a device including a series of steps or units is not limited to those steps or units explicitly listed, but may include other steps or units not explicitly listed or inherent to such process, method, product or device.

Fingerprint recognition technology is a recognition means for verifying identity through fingerprint comparison, and it is also the most widely used biometric recognition technology nowadays. With the development of terminal device and the development of fingerprint recognition technology, the demand for fingerprint recognition technology in the field of fingerprint locks is also expanding. Since there is a high requirement for the standby power consumption of a fingerprint recognition system in the field of fingerprint locks, how to reduce the power consumption of the fingerprint recognition system has become a technical problem to be solved urgently. However, in the prior art, the power supply of a fingerprint sensor and a fingerprint algorithm chip are disconnected when the fingerprint recognition system is in a standby state, a touch chip receives a signal of touching metal ring by a user when the user touches the metal ring, and then the fingerprint sensor and the fingerprint algorithm chip are power supplied and the fingerprint recognition is performed. Although the standby power consumption requirement is met, the fingerprint recognition system is easy to be interfered and has low reliability since the metal ring is exposed and has high sensitivity. Based on this, the present disclosure provides a fingerprint sensor, a fingerprint recognition module and a fingerprint recognition system.

Hereinafter, an exemplary scenario of an embodiment of the present disclosure will be described.

The fingerprint sensor, the fingerprint recognition module and the fingerprint recognition system provided in embodiments of the present disclosure can be used in any scenarios requiring fingerprint recognition, which is not limited in embodiments of the present disclosure. The present disclosure takes an application scenario of a fingerprint lock as an example for brief introduction. Generally, in a scenario where a user needs to unlock a fingerprint lock, the user should touch a fingerprint sensor with a finger, so that the fingerprint sensor can collect fingerprint information of the user and send the fingerprint information to a fingerprint algorithm chip for recognizing and verifying, so as to determine whether the fingerprint of the user is a preset fingerprint. If the fingerprint of the user is the preset fingerprint, the fingerprint lock is unlocked; if the fingerprint of the user is not the preset fingerprint, the fingerprint lock cannot be unlocked, which improves the security and intelligence of the fingerprint lock. However, in a long period of time, the user may not need to unlock the fingerprint lock. For example, a fingerprint lock installed on a door only needs to be started when the user needs to unlock the door. If the fingerprint sensor and fingerprint algorithm chip are powered during a sleep period of the fingerprint lock, a lot of power will be consumed. Therefore, it is necessary to wake up the fingerprint lock with one key only when the user uses the fingerprint lock, to reduce power consumption. Based on this, the present disclosure provides a fingerprint sensor, a fingerprint recognition module and a fingerprint recognition system.

Based on the above application scenario, the technical solution of the present disclosure will be described in detail below.

FIGS. 1A-1D are schematic diagrams of longitudinal sections of a fingerprint sensor provided in an embodiment of the present disclosure. As shown in FIG. 1A, the fingerprint sensor provided in an embodiment of the present disclosure may include:

a sensor die 13, configured to collect fingerprint information; and a package structure 11, configured to package the sensor die 13; where, the package structure 11 includes a first metal electrode 12, which is connected with a touch detection module, where the touch detection module is connected with a control module and is configured to feed back a touch signal to the control module, so as to enable the control module to supply power to the fingerprint sensor according to the touch signal, and then enable the sensor die 13 to collect fingerprint information.

Figure 1B:
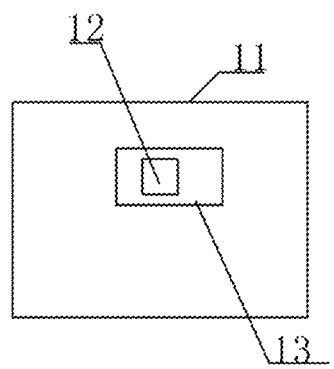
FIG. 1B is a schematic diagram of longitudinal sections of a fingerprint sensor provided in an embodiment of the present disclosure.

As shown in FIG. 1B, a fingerprint sensor provided in an embodiment of the present disclosure may include:

a sensor die 13, configured to collect fingerprint information; and a package structure 11, configured to package the sensor die 13; where the sensor die 13 includes a first metal electrode 12, which is connected with a touch detection module, where the touch detection module is connected with a control module and is configured to feed back a touch signal to the control module, so as to enable the control module to supply power to the fingerprint sensor according to the touch signal, and then enable the sensor die 13 to collect fingerprint information.

The embodiment of the present disclosure does not limit the specific structure of the sensor die. In a possible implementation, the sensor die includes a detection electrode, which is configured to collect the fingerprint information, and the first metal electrode is located at a periphery of the detection electrode. In an implementation, the detection electrode includes a plurality of capacitors arranged in a matrix, and the embodiment of the present disclosure does not limit the specific size, number or matrix arrangement of the plurality of capacitors. In addition, the first metal electrode may be located on a same layer as the detection electrode, or on a different layer, which is not limited in the embodiment of this disclosure.

The first metal electrode may be provided in the package structure or in the sensor die, as long as the first metal electrode can be connected with the touch detection module, and the touch detection module can be connected with the control module and is configured to feed back a touch signal to the control module, and thus can enable the control module to supply power to the fingerprint sensor according to the touch signal, and then enable the sensor die to collect fingerprint information.

The sensor die 13 is configured to collect fingerprint information, and the material and structure of the sensor die 13 are not limited in the embodiment of the present disclosure, for example, the sensor die 13 may be a silicon sensor die. The first metal electrode 12 is located in the package structure 11, and the shape, size, material and location of the first metal electrode are not limited in the embodiment of the present disclosure. For example, the first metal electrode may be a cube, a cuboid, an ellipsoid, or a ring and etc., and the first metal electrode 12 may be located above, below and around the sensor die 13. The first metal electrode 12 may be connected with the touch detection module through a first pin, the touch detection module may be connected with the control module and is configured to feed back a touch signal to the control module, and the touch signal is used to determine whether there is a user touching the fingerprint sensor. The package structure 11 can be used to package the sensor die 13 on the basis of user demands. The specific structure, material, and etc. of the package structure are not limited in the embodiment of the present disclosure.

Figure 1C:
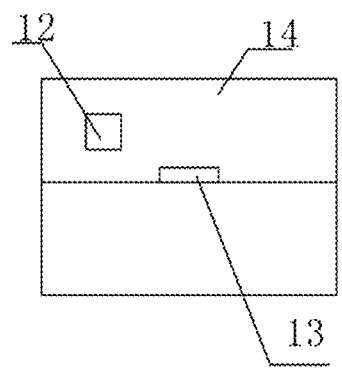
FIG. 1C is a schematic diagram of longitudinal sections of a fingerprint sensor provided in an embodiment of the present disclosure.

In a possible implementation, as shown in FIG. 1C, the package structure 11 may include a plastic packaging material 14 which is located above or covers the sensor die 13, and the first metal electrode 12 is located in the plastic packaging material 14. The specific location of the first metal electrode 12 in the plastic packaging material 14 is not limited in the embodiment of the present disclosure. For example, the first metal electrode can be located above the sensor die, or around the sensor die, or connected with the sensor die and the like, as long as the sensor die's function of collecting the fingerprint information is not affected. FIG. 1C is only an exemplary location diagram, and the embodiment of the present disclosure are not limited thereto.

Figure 1D:
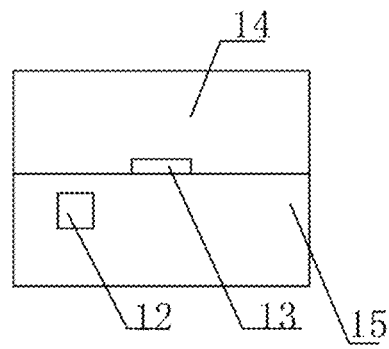
FIG. 1D is a schematic diagram of longitudinal sections of a fingerprint sensor provided in an embodiment of the present disclosure.

In another possible implementation, as shown in FIG. 1D, the package structure 11 may include a substrate 15, on which the sensor die 13 is located, and in which the first metal electrode 12 is located. The specific location of the first metal electrode 12 in the substrate 15 is not limited in the embodiment of the present disclosure. For example, the first metal electrode is located in an area of the substrate directly below the sensor die, or in other locations, and etc. FIG. 1D is only an exemplary location diagram, and the embodiment of the present disclosure is not limited thereto. In addition, the shape, material, size and specific structure and the like of the substrate are not limited in the embodiment of the present disclosure, which may be set in accordance with the requirement of the user. In a possible implementation, the substrate may be a PCB or a semiconductor substrate.

In a possible implementation, the substrate includes an insulation area and a wiring area, and the wiring area is used to set a circuit, for example, to lead out a pin in the sensor die. The location, size, shape and material of the insulation area are not limited in the embodiment of the present disclosure. Similarly, the location, size, shape and material of the wiring area are not limited in the embodiment of the present disclosure, as long as the wiring function can be realized.

In a possible implementation, the first metal electrode 12 may be located in a preset area of the wiring area in the substrate 15, and there is no metal material in a preset space of an area directly above the first metal electrode 12. The preset area set in the wiring area may be an insulation area and be set independently of the circuit in the wiring area. Setting the first metal electrode in the preset area does not affect the sensor die's function of collecting the fingerprint information. The specific location of the preset area is not limited in the embodiment of the present disclosure. In addition, the size of the preset space can be set in accordance with the requirement of the user. There should be no metal substance exists in the preset space of the first metal electrode which corresponds to a human hand. For example, the preset space is the area directly above the first metal electrode, or the preset space is smaller than the area directly above the first metal electrode, as long as the following can be ensured: when the first metal electrode is connected with the touch detection module through the first pin, and the touch detection module is connected with the control module and feeds back a touch signal to the control module, the control module is enabled to supply power to the fingerprint sensor according to the touch signal, and then the sensor die is enabled to collect the fingerprint information.

In another possible implementation, the first metal electrode is located in a top metal layer of the substrate. For example, the first metal electrode is located in a top metal layer in the insulation area of the substrate. The top metal layer may only include the first metal electrode. The shape, material and etc. of the first metal electrode are not limited in the embodiment of the present disclosure. In an implementation, the first metal electrode may be annular.

In another possible implementation, the first metal electrode 12 is located in the insulation area of the substrate 15, and there is no wiring area in a preset space of the area directly above the first metal electrode 12 in the vertical direction. Therefore, the first metal electrode has no influence on the circuit in the wiring area, which ensures the normal operation of the fingerprint sensor in collecting the fingerprint information, and the size of the preset space can be set as required. There should be no metal substance exists in the preset space of the first metal electrode which corresponds to a human hand. For example, the preset space is the area directly above the first metal electrode, or the preset space is smaller than the area directly above the first metal electrode, as long as the following can be ensured: when the first metal electrode is connected with the touch detection module through the first pin, and the touch detection module is connected with the control module and feeds back a touch signal to the control module, the control module is enabled to supply power to the fingerprint sensor according to the touch signal, and then the sensor die is enabled to collect the fingerprint information. In another possible implementation, the first metal electrode 12 is located in the substrate 15, and the metal, an area of which is smaller than a preset threshold, exists in the area above the first metal electrode 12 in the vertical direction, which is not limited in the embodiment of the present disclosure.

For the convenience of understanding, the principle of realizing one-key wake-up on the fingerprint sensor through the first metal electrode will be described below.

Since there is an inductive capacitor between any two conductive objects, the first metal electrode and the ground form an inductive capacitor, and the capacitance value of the induction capacitor is fixed when the surrounding environment remains unchanged. When a human finger gets close to the first metal electrode, an inductive capacitor formed by the human finger and the ground is connected in parallel with the induction capacitor formed by the first metal electrode and the ground, which increases the total inductive capacitance value. In the embodiment of the present disclosure, the function of one-key wake-up on the fingerprint sensor is realized by detecting the change of capacitance of the first metal electrode in the fingerprint sensor and then determining whether there is a finger touching the fingerprint sensor.

Figure 2:
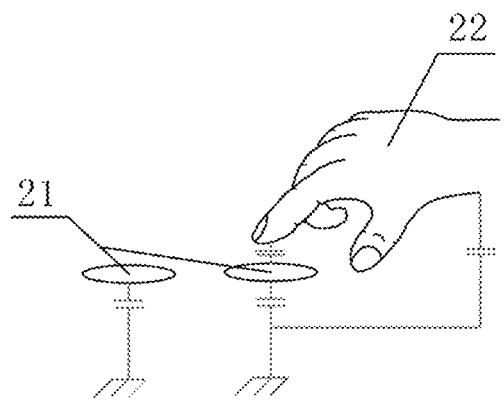
FIG. 2 is a schematic diagram of the working principle of a first metal electrode provided in an embodiment of the present disclosure.
Figure 3:
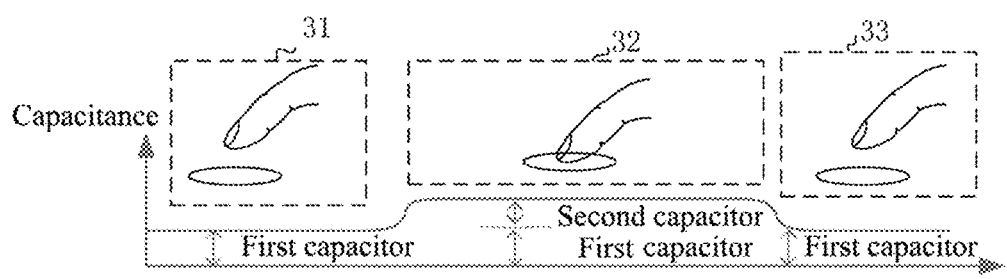
FIG. 3 is a schematic diagram of a scenario of touch detection provided in an embodiment of the present disclosure.

Exemplarily, FIG. 2 is a schematic diagram of the working principle of the first metal electrode provided in an embodiment of the present disclosure. As shown in FIG. 2, a first capacitor is formed between the first metal electrode 21 and the ground, and a second capacitor is formed between a human finger 22 and the ground. When the finger touches the first metal electrode 21, the first capacitor and the second capacitor are connected in parallel, and the total inductive capacitance is a sum of the capacitance of the first capacitor and the capacitance of the second capacitor. FIG. 3 is a schematic diagram of a scenario of touch detection provided in an embodiment of the present disclosure. As shown in FIG. 3, the touch scene 31 indicates that when the finger is not touching the fingerprint sensor, ontology capacitance of the first metal electrode is the capacitance of the first capacitor; the touch scene 32 indicates that when the human finger is touching the fingerprint sensor, the capacitance of the first metal electrode is the sum of the capacitance of the first capacitor and the capacitance of the second capacitor; the touch scene 33 indicates that when the finger leaves after touching the fingerprint sensor, the inductive capacitance of the first metal electrode returns to the capacitance of the first capacitor. Based on the above principle, it can be determined whether there is a finger touch according to the change of the detected capacitance of the fingerprint sensor.

In the embodiment of the present disclosure, the first metal electrode is connected with the touch detection module, and the touch detection module is connected with the control module and is configured to feed back a touch signal to the control module. In an implementation, the touch signal may be an inductive capacitance value or a capacitance change value, and etc., which is not limited in the embodiment of the present disclosure. The touch detection module can detect the capacitance change of the first metal electrode. The touch detection module may be a chip. The specific structure and form of the touch detection module are not limited in the embodiment of the present disclosure. The touch detection module determines whether there is a finger touching the fingerprint sensor according to the change of the touch signal, and the touch detection module is connected with the control module, so that the control module determines whether to supply power for the fingerprint sensor. If it is determined that there is a finger touching the fingerprint sensor, the control module controls the power source to supply power to the fingerprint sensor; if it is determined that there is no finger touching the fingerprint sensor, the power source of the fingerprint sensor is kept disconnected to achieve the purpose of saving energy consumption.

After the control module supplies power to the fingerprint sensor according to the touch signal, the sensor die in the fingerprint sensor collects fingerprint information, and can send the collected fingerprint information to the fingerprint algorithm chip, so that the fingerprint can be recognized and verified by the fingerprint algorithm chip.

In a possible implementation, the fingerprint sensor provided in the embodiment of the present disclosure may further include a cover plate, which is located on the plastic packaging material for protecting the fingerprint sensor, and the cover plate may be glass, and etc. The material, thickness, color, shape, and etc. of the cover plate are not limited in the embodiment of the present disclosure.

By providing the metal electrode in the sensor die or the package structure, the fingerprint sensor provided in embodiments of the present disclosure effectively avoids mis-touch of the metal electrode, which improves the reliability of the fingerprint sensor. In addition, the metal electrode is connected with the touch detection module, and the touch detection module is connected with the control module and is configured to feed back the touch signal to the control module, so as to enable the control module to supply power to the fingerprint sensor according to the touch signal. Under the premise of ensuring low standby power consumption of the fingerprint recognition system, the anti-interference ability and the ESD performance are improved, and the flexibility of the touch detection scheme is improved as well, therefore it is easier to meet the requirements of a whole lock.

Figure 4:
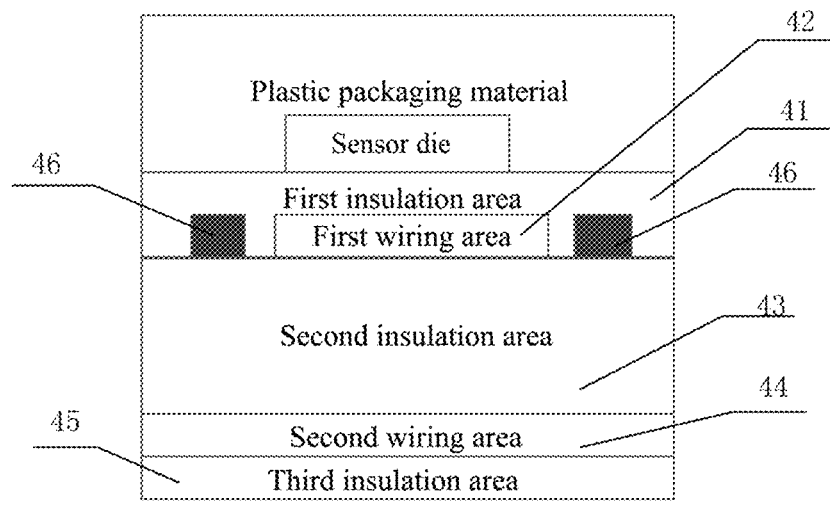
FIG. 4 is a schematic diagram of a longitudinal section of a fingerprint sensor provided in another embodiment of the present disclosure.

In a possible implementation, FIG. 4 is a schematic diagram of longitudinal section of the fingerprint sensor provided in another embodiment of the present disclosure. As shown in FIG. 4, the substrate in the fingerprint sensor provided in the embodiment of the present disclosure includes, sequentially from top to bottom:

a first insulation area 41, a first wiring area 42, a second insulation area 43, a second wiring area 44 and a third insulation area 45. The first metal electrode 46 is located at a periphery of the first wiring area 42 and in the first insulation area 41.

The first insulation area 41 is located between the sensor die and the first wiring area 42, and the first metal electrode 46 is located at the periphery of the first wiring area 42 and in the first insulation area 41. The shape, thickness, material and size of the first metal electrode are not limited in the embodiment of the present disclosure. The first metal electrode may be configured based on user demands Exemplarily, the area size of the first metal electrode 46 may be configured by considering the ontology capacitance of the first metal electrode 46, and the amount of change in the capacitance of the first metal electrode 46 to the ground when a finger touches the fingerprint sensor. When a finger touches the fingerprint sensor, the amount of change in the capacitance of the first metal electrode 46 to the ground is related to the shape of the first metal electrode 46, the laminated structure between the first metal electrode 46 and the finger, and the dielectric constant of the first metal electrode 46. The shape, size, material, and etc. of the first metal electrode 46 may be comprehensively considered according to actual demands when the first metal electrode 46 is designed, to satisfy the actual demands of a user.

The second insulation area 43 is located between the first wiring area 42 and the second wiring area 44. The material, shape, thickness and the like of the second insulation area 43 are not limited in the embodiment of the present disclosure. The second wiring area 44 is a bottom wiring area for wiring. The material, shape, thickness and the like of the second wiring area 44 are not limited in the embodiment of the present disclosure. In a possible implementation, the material of the second wiring area 44 is copper. In an implementation, the corresponding area in the second wiring area 44 directly below the first metal electrode 46 is a ground laying area. The anti-interference ability of the first metal electrode 46 is improved by performing ground laying on the corresponding area in the second wiring area 44 directly below the first metal electrode 46. The specific process of performing the ground laying is not limited in the embodiment of the present disclosure.

The third insulation area 45 is located below the second wiring area and is configured to ensure the stability of the circuit in the second wiring area 44. The material, thickness, shape and the like of the third insulation area are not limited in the embodiment of the present disclosure, as long as user demands can be satisfied.

Figure 5:
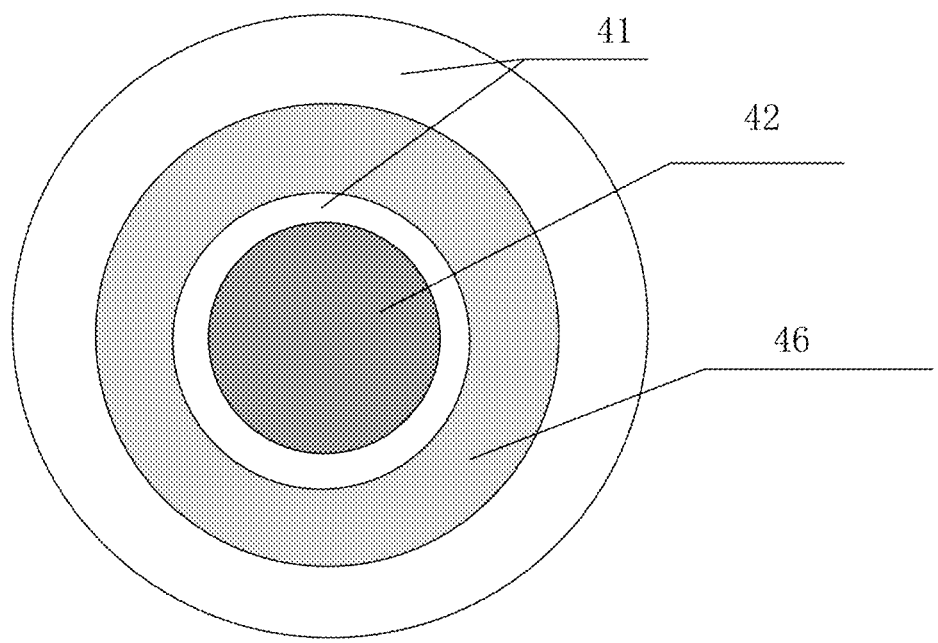
FIG. 5 is a schematic top diagram of a first insulation area of a fingerprint sensor provided in another embodiment of the present disclosure.

To describe the first metal electrode more clearly, exemplarily, FIG. 5 is a schematic top diagram of the first insulation area of the fingerprint sensor provided in another embodiment of the present disclosure. As shown in FIG. 5, the first metal electrode 46 is located at the periphery of the first wiring area 42, and there is a first gap between the first metal electrode 46 and the first wiring area 42, and the substance in the gap may be the insulation material in the first insulation area 41. The width, shape and the like of the first gap are not limited in the embodiment of the present disclosure.

Figure 6:
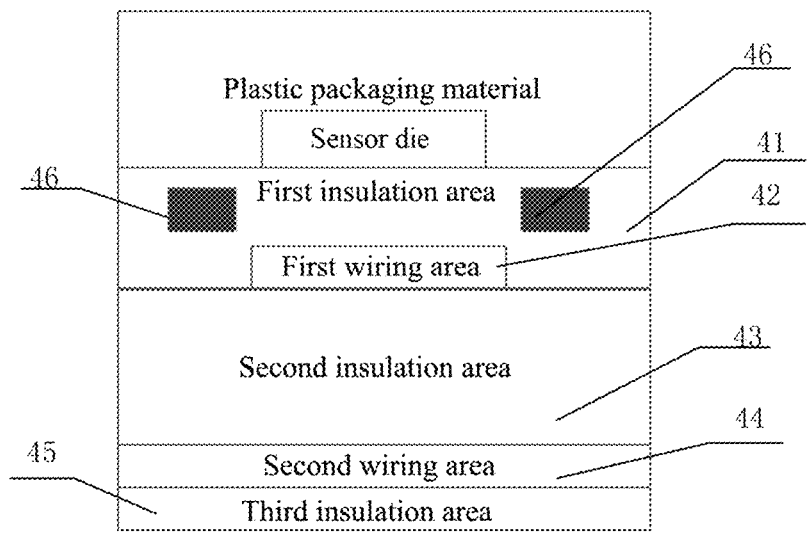
FIG. 6 is a schematic diagram of a longitudinal section of a fingerprint sensor provided in still another embodiment of the present disclosure.

The location of the first metal electrode in the substrate may also be configured according to the manner in the following embodiment. FIG. 6 is a schematic diagram of a longitudinal section of a fingerprint sensor provided in still another embodiment of the present disclosure. As shown in FIG. 6, the substrate in the fingerprint sensor provided in the embodiment of the present disclosure includes, sequentially from top to bottom: a first insulation area 41, a first wiring area 42, a second insulation area 43, a second wiring area 44 and a third insulation area 45. The first metal electrode 46 is located above the first wiring area 42 and in the first insulation area 41. The first wiring area and the second wiring area are connected with pins of the sensor die for connecting the sensor die with other device or grounding the sensor die, and there is no direct electrical connection between the first metal electrode and the first wiring area, nor between the first metal electrode and the second wiring area.

Figure 7:
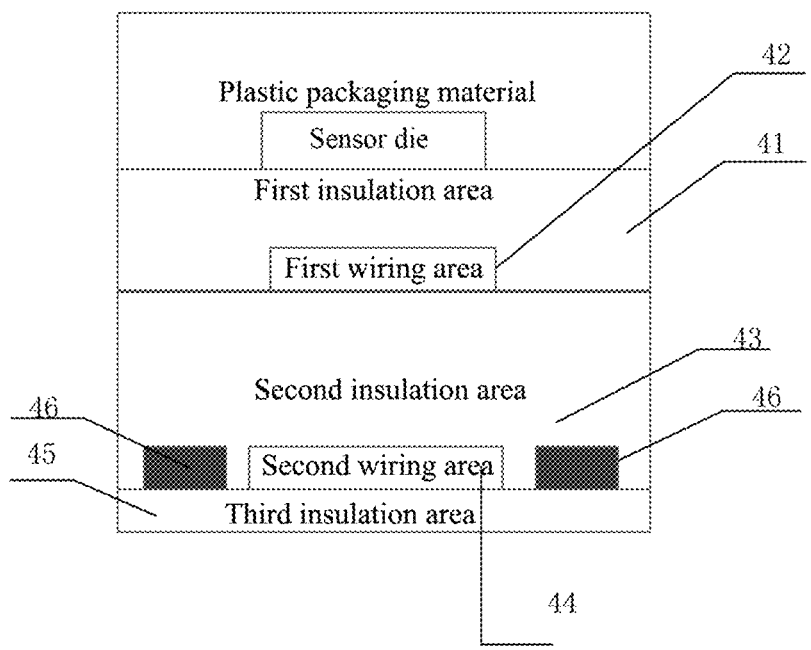
FIG. 7 is a schematic diagram of a longitudinal section of a fingerprint sensor provided in yet another embodiment of the present disclosure.

FIG. 7 is a schematic diagram of a longitudinal section of a fingerprint sensor provided in yet another embodiment of the present disclosure. As shown in FIG. 7, the substrate in the fingerprint sensor provided in the embodiment of the present disclosure includes, sequentially from top to bottom: a first insulation area 41, a first wiring area 42, a second insulation area 43, a second wiring area 44 and a third insulation area 45. The first metal electrode 46 is located in the second insulation area 43, and there is no metal or there is a metal with an area smaller than a preset threshold, in the area above the first metal electrode 46 in the vertical direction. For example, the first metal electrode may be located around the second wiring area, or a preset area may be configured in the second wiring area in which the first metal electrode may be provided, or the first metal electrode may be located in the area above the second wiring area, as long as there is no metal, or there is a metal with an area smaller than a preset threshold, in the area above the first metal electrode in the vertical direction. The size of the preset area may be set according to actual demands, which is not limited in the embodiment of the present disclosure.

It should be noted that the above-mentioned FIG. 6 and FIG. 7 are merely exemplary structural diagrams of the substrate, and the substrate structure and the location of the first metal electrode in the fingerprint sensor provided in the embodiment of the present disclosure are not limited thereto.

Figure 8:
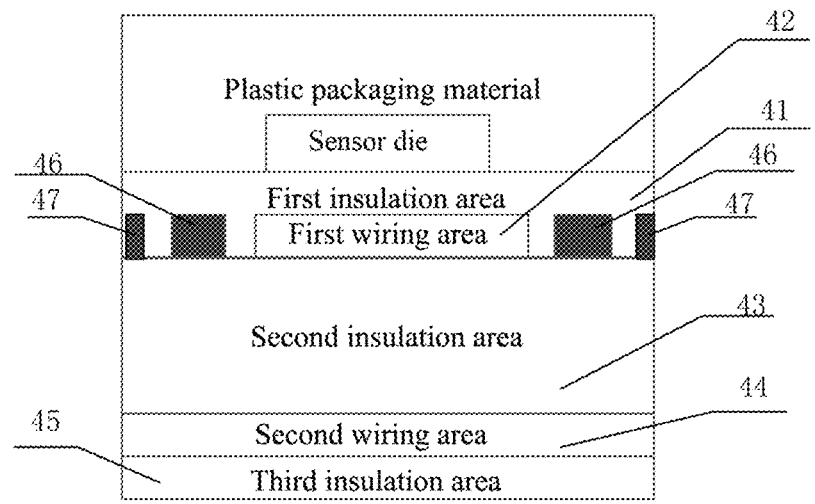
FIG. 8 is a schematic diagram of a longitudinal section of a fingerprint sensor provided in yet another embodiment of the present disclosure.

In an implementation, on the basis of any of the above embodiments, in order to prevent the first metal electrode from electromagnetic interference, a fingerprint sensor is provided in yet another embodiment of the present disclosure. FIG. 8 is a schematic diagram of a longitudinal section of the fingerprint sensor provided in the yet another embodiment of the present disclosure. As shown in FIG. 8, the fingerprint sensor provided in the embodiment of the present disclosure may further include:

a second metal electrode 47, which is located at the periphery of the first metal electrode 46 and connected with the grounding end of the fingerprint sensor.

The second metal electrode is located at the periphery of the first metal electrode for preventing the first metal electrode from electromagnetic interference, and improving the reliability of the first metal electrode. The material, shape of the second metal electrode 47, and the distance between the second metal electrode 47 and the first metal electrode 46 are not limited in the embodiment of the present disclosure, as long as it can prevent the first metal electrode 46 from electromagnetic interference. In a possible implementation, the material of the second metal electrode 47 is copper. The shape of the second metal electrode 47 is a circular ring, and the gap between the second metal electrode 47 and the first metal electrode 46 can be provided according to user demands, process accuracy, and the like.

Figure 9:
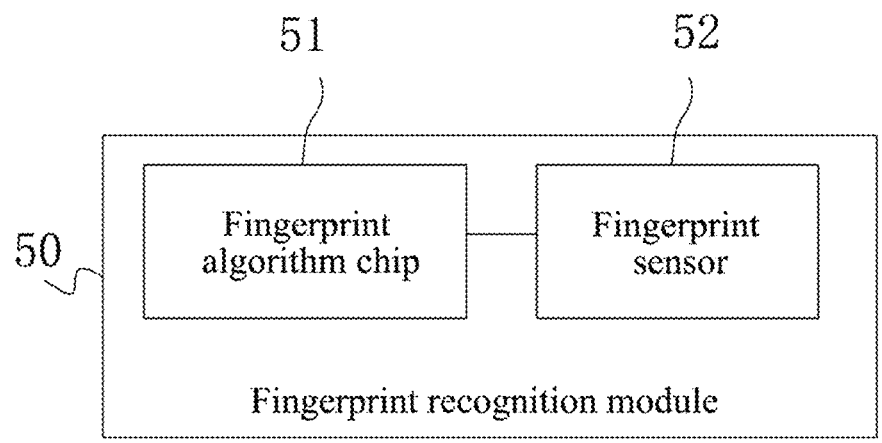
FIG. 9 is a schematic structural diagram of a fingerprint recognition module provided in an embodiment of the present disclosure.

An embodiment of the present disclosure provides a fingerprint recognition module. FIG. 9 is a schematic structural diagram of a fingerprint recognition module provided in an embodiment of the present disclosure. As shown in FIG. 9, the fingerprint recognition module 50 provided in the embodiment of the present disclosure includes:

a fingerprint algorithm chip 51 and a fingerprint sensor 52. The fingerprint algorithm chip 51 is connected with the fingerprint sensor 52. The fingerprint sensor 52 is configured to collect fingerprint information. The fingerprint algorithm chip 51 is configured to process the fingerprint information. The content and effect about the fingerprint sensor 52 can refer to the fingerprint sensor provided in the embodiments above, which will not be repeated in the embodiment of the present disclosure.

The fingerprint recognition module in this scheme includes a fingerprint algorithm chip and a fingerprint sensor, where, the fingerprint sensor is provided with a metal electrode in the package, which improves the reliability of the fingerprint sensor, and thus further improves the reliability of the fingerprint recognition module. Furthermore, the metal electrode is connected with the touch detection module, and the touch detection module is connected with the control module and feeds back a touch signal to the control module, so as to enable the control module to supply power to the fingerprint recognition module according to the touch signal, it is ensured that only the touch detection module is power supplied when there is no finger pressing, which reduces the standby power consumption of the fingerprint recognition module.

Figure 10:
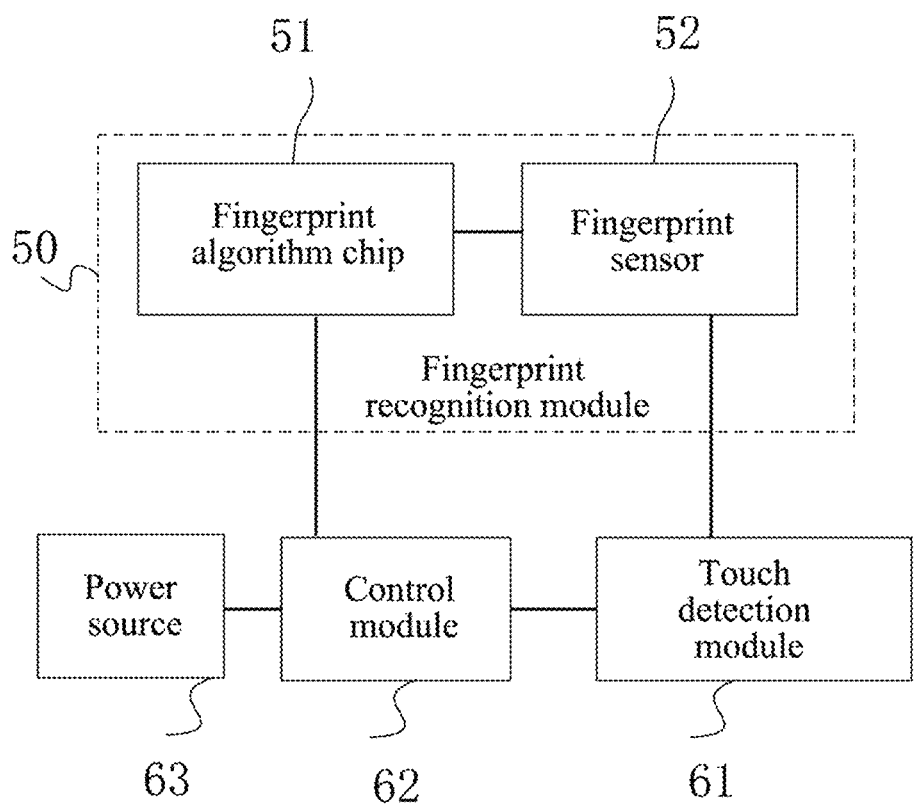
FIG. 10 is a schematic structural diagram of a fingerprint recognition system provided in an embodiment of the present disclosure.

An embodiment of the present disclosure provides a fingerprint recognition system. FIG. 10 is a structural schematic diagram of a fingerprint recognition system provided in an embodiment of the present disclosure. As shown in FIG. 10, the present disclosure provides a fingerprint recognition system, which includes: a touch detection module 61, a control module 62 and a fingerprint recognition module 50 provided in the embodiment of the present disclosure. The fingerprint recognition module 50 includes a fingerprint sensor 52 and a fingerprint algorithm chip 51.

The touch detection module 61 is connected with a first metal electrode (not shown) in the fingerprint sensor 52 through a first pin (not shown) of the fingerprint recognition module 50 and configured to detect whether there is a finger touching the fingerprint sensor 52.

The touch detection module 61 is connected with the control module 62 and is configured to feed back to the control module 62 whether there is a finger touching the fingerprint sensor 52. If the touch detection module 61 detects that there is a finger touching the fingerprint sensor 52, it sends a touch signal to the control module 62.

The control module 62 is connected with the fingerprint recognition module through a second pin (not shown) in the fingerprint recognition module 50 and is configured to control the power source 63 to supply power to the fingerprint recognition module 50 according to the touch signal sent by the touch detection module 61.

In the fingerprint recognition system provided in the embodiment of the present disclosure, the touch detection module is connected with the first metal electrode in the fingerprint sensor through a first pin of the fingerprint recognition module, detects whether there is a finger touching the fingerprint sensor, and feeds back a touch signal to the control module, so as to enable the control module to control the power source to supply power for the fingerprint recognition module, which ensures that the power source supplies power only for the touch detection module when there is no finger pressing, thereby reducing the power consumption of the fingerprint recognition system.

Finally, it should be noted that the foregoing embodiments are merely intended for describing the technical solutions of the present disclosure, rather than limiting them. Although the present disclosure has been described in detail with reference to the foregoing embodiments, persons of ordinary skill in the art should understand that they may still make modifications to the technical solutions described in the foregoing embodiments or make equivalent substitutions to some or all technical features thereof, and the modifications or substitutions do not deviate the essence of the corresponding technical solutions from the scope of the technical solutions of the embodiments of the present disclosure.

What is claimed is:

1. A fingerprint sensor, comprising:
   a sensor die configured to collect fingerprint information; and
   a package structure configured to package the sensor die;
   wherein the sensor die or the package structure comprises a first metal electrode, the first metal electrode is connected with a touch detection module, and the touch detection module is connected with a control module and is configured to feed back a touch signal to the control module, so as to enable the control module to supply power to the fingerprint sensor according to the touch signal, and then enable the sensor die to collect fingerprint information,
   wherein the package structure comprises a substrate, the sensor die is located on the substrate; the first metal electrode is located in an insulation area in the substrate, and there is no wiring area in a preset space of an area directly above the first metal electrode in a vertical direction;
   wherein the substrate comprises, sequentially from top to bottom: a first insulation area, a first wiring area, a second insulation area, a second wiring area and a third insulation area; and the first metal electrode is located at a periphery of the first wiring area.

2. The fingerprint sensor according to claim 1, wherein the package structure comprises a plastic packaging material, the plastic packaging material is located above or covers the sensor die.

3. The fingerprint sensor according to claim 1, wherein the substrate is a printed circuit board (PCB) or a semiconductor substrate.

4. The fingerprint sensor according to claim 1, wherein the substrate comprises, sequentially from top to bottom:
   a first insulation area, a first wiring area, a second insulation area, a second wiring area and a third insulation area, wherein the first metal electrode is located above the first wiring area and located in the first insulation area.

5. The fingerprint sensor according to claim 1, further comprising:
   a second metal electrode, wherein the second metal electrode is located at a periphery of the first metal electrode and is connected with a grounding end of the fingerprint sensor.

6. The fingerprint sensor according to claim 1, wherein, in the second wiring area, a corresponding area directly below the first metal electrode is a ground laying area.

7. The fingerprint sensor according to claim 6, wherein the first metal electrode is annular.

8. The fingerprint sensor according to claim 1, wherein the sensor die comprises a plurality of detection electrodes, the plurality of detection electrodes are configured to collect the fingerprint information, and the first metal electrode is located at a periphery of the plurality of detection electrodes.

9. The fingerprint sensor according to claim 8, wherein the plurality of detection electrodes are arranged in a matrix.

10. A fingerprint recognition module, comprising:
    a fingerprint sensor, comprising:
       a sensor die, configured to collect fingerprint information; and
       a package structure configured to package the sensor die; wherein the sensor die or the package structure comprises a first metal electrode, the first metal electrode is connected with a touch detection module, and the touch detection module is connected with a control module and is configured to feed back a touch signal to the control module, so as to enable the control module to supply power to the fingerprint sensor according to the touch signal, and then enable the sensor die to collect fingerprint information; and
    a fingerprint algorithm chip connected with the fingerprint sensor and configured to process the fingerprint information,
    wherein the package structure comprises a substrate, the sensor die is located on the substrate; the first metal electrode is located in an insulation area in the substrate, and there is no wiring area in a preset space of an area directly above the first metal electrode in a vertical direction;

wherein the substrate comprises, sequentially from top to bottom: a first insulation area, a first wiring area, a second insulation area, a second wiring area and a third insulation area; and the first metal electrode is located at a periphery of the first wiring area.

11. The fingerprint recognition module according to claim 10, wherein the fingerprint sensor further comprises:

a second metal electrode, wherein the second metal electrode is located at a periphery of the first metal electrode and is connected with a grounding end of the fingerprint sensor.

12. The fingerprint recognition module according to claim 10, wherein, in the second wiring area, a corresponding area directly below the first metal electrode is a ground laying area.

13. A fingerprint sensor, comprising:

a sensor die configured to collect fingerprint information; and a package structure configured to package the sensor die, wherein the sensor die or the package structure comprises a first metal electrode, the first metal electrode is connected with a touch detection module, and the touch detection module is connected with a control module and is configured to feed back a touch signal to the control module, so as to enable the control module to supply power to the fingerprint sensor according to the touch signal, and then enable the sensor die to collect fingerprint information, wherein the package structure comprises a substrate, the sensor die is located on the substrate; the first metal electrode is located in an insulation area in the substrate, and there is no wiring area in a preset space of an area directly above the first metal electrode in a vertical direction, wherein the substrate comprises, sequentially from top to bottom: a first insulation area, a first wiring area, a second insulation area, a second wiring area and a third insulation area; and the first metal electrode is located above the first wiring area and located in the first insulation area.

14. The fingerprint sensor according to claim 13, wherein the package structure comprises a plastic packaging material, the plastic packaging material is located above or covers the sensor die.

15. The fingerprint sensor according to claim 13, wherein the substrate is a printed circuit board (PCB) or a semiconductor substrate.

16. The fingerprint sensor according to claim 13, further comprising:

a second metal electrode, wherein the second metal electrode is located at a periphery of the first metal electrode and is connected with a grounding end of the fingerprint sensor.

17. The fingerprint sensor according to claim 13, wherein, in the second wiring area, a corresponding area directly below the first metal electrode is a ground laying area.

18. The fingerprint sensor according to claim 17, wherein the first metal electrode is annular.

19. The fingerprint sensor according to claim 13, wherein the sensor die comprises a plurality of detection electrodes, the plurality of detection electrodes are configured to collect the fingerprint information, and the first metal electrode is located at a periphery of the plurality of detection electrodes.

20. The fingerprint sensor according to claim 19, wherein the plurality of detection electrodes are arranged in a matrix.

* * * * *